(12) United States Patent
Choi et al.

(10) Patent No.: US 9,692,996 B2
(45) Date of Patent: Jun. 27, 2017

(54) SENSOR AND METHOD FOR SUPPRESSING BACKGROUND SIGNAL

(71) Applicant: Samsung Electronics Co., Ltd., Suwon-si (KR)

(72) Inventors: Jae-hyuk Choi, Yongin-si (KR); Jung-soon Shin, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 234 days.

(21) Appl. No.: 14/324,660

(22) Filed: Jul. 7, 2014

(65) Prior Publication Data

US 2015/0116557 A1   Apr. 30, 2015

(30) Foreign Application Priority Data

Oct. 25, 2013 (KR) .................. 10-2013-0128026

(51) Int. Cl.
    *H04N 5/335* (2011.01)
    *H04N 5/357* (2011.01)
    *H04N 5/365* (2011.01)
    *H04N 5/378* (2011.01)

(52) U.S. Cl.
    CPC ........... *H04N 5/3575* (2013.01); *H04N 5/365* (2013.01); *H04N 5/378* (2013.01)

(58) Field of Classification Search
    CPC .............................. H04N 5/357; H04N 5/3575
    USPC ............................................................ 348/294
    See application file for complete search history.

(56) References Cited

U.S. PATENT DOCUMENTS

| 6,906,793 | B2 | 6/2005 | Bamji et al. | |
| 7,283,163 | B1 * | 10/2007 | Noda | ............. G02B 7/34 348/243 |
| 7,319,423 | B2 | 1/2008 | Augusto et al. | |
| 9,137,521 | B2 | 9/2015 | Shin et al. | |
| 2014/0071180 | A1 | 3/2014 | Shin et al. | |

FOREIGN PATENT DOCUMENTS

| KR | 10-0978747 | 8/2010 |
| KR | 10-2011-0051391 | 5/2011 |
| KR | 10-2014-0015174 A | 2/2014 |
| KR | 10-2014-0034029 A | 3/2014 |

* cited by examiner

*Primary Examiner* — Usman Khan

(74) *Attorney, Agent, or Firm* — Harness, Dickey & Pierce, P.L.C.

(57) ABSTRACT

A sensor for suppressing a background signal is provided. The sensor includes: a pixel array that detects a signal by using a plurality of pixels; an accumulator that converts a differential signal between two signals detected from an arbitrary pixel of the pixel array at predetermined times into a digital signal and accumulates the digital signal; and a digital memory that stores the accumulated digital signal.

20 Claims, 12 Drawing Sheets

SENSOR AND METHOD FOR SUPPRESSING BACKGROUND SIGNAL

CROSS-REFERENCE TO RELATED APPLICATIONS

This application claims the priority benefit of Korean Patent Application No. 10-2013-0128026, filed on Oct. 25, 2013 in the Korean Intellectual Property Office, the disclosure of which is incorporated herein in its entirety by reference.

BACKGROUND

1. Field

Embodiments relate to a sensor and method for suppressing a background signal.

2. Description of the Related Art

In various sensing applications, due to a background signal, the accuracy of a signal to be detected may be reduced or the signal may not be detected. In particular, when the background signal is large, a sensor deviates from a dynamic range, which is a maximum range in which the sensor is able to perform detection and enters a saturation state. Therefore, a signal to be detected may not be distinguishable any more.

For example, in infrared imaging, a temperature differential to be detected is much smaller than the temperature of the background. As another example, in fluorescence imaging, light from an excitation source is directed toward to a target cell and light emitted by the cell itself is measured. In this case, the intensity of light emitted from the cell is much smaller than the excitation source. As another example, in a time-of-flight (TOF) type 3D image sensor that measures a travel time of light by radiating light on an object and detecting reflected and returned light, when background light has a high intensity, radiated and returned light and the background light both are incident on the sensor. Therefore, error may occur in depth, or each pixel of the image sensor enters a saturation state due to the background light, thereby not acquiring depth.

In various sensing applications, a sensor may include a temporal or spatial differential readout circuit in order to suppress the background signal of a common mode. The background signal may be suppressed by acquiring a differential signal by such a differential readout circuit. However, when the background signal has a high intensity or the background signal is accumulated for a long time because a sensing time is long, saturation occurs, thereby causing a desired signal not to be distinguishable from the background signal. Thus, there has been a research for a sensor employing a new structure and a method for preventing saturation due to a background signal.

SUMMARY

In an aspect of one or more embodiments, there are provided methods and apparatuses for providing a sensor for suppressing a background signal and a method for suppressing a background signal, which detect a desired signal even in an environment where there is a large background signal or a background signal is accumulated during a long sensing time. Additional aspects will be set forth in part in the description which follows and, in part, will be apparent from the description, or may be learned by practice of one or more embodiments.

In an aspect of one or more embodiments, there is provided a sensor for suppressing a background signal which includes: a pixel array that detects a signal by using a plurality of pixels; an accumulator that converts a differential signal between two signals detected from an arbitrary pixel of the pixel array at predetermined times into a digital signal and accumulates the digital signal; and a digital memory that stores the accumulated digital signal.

In an aspect of one or more embodiments, there is provided a method for suppressing a background signal which includes: detecting two signals from an arbitrary pixel of a pixel array that detects a signal by using a plurality of pixels at each predetermined time; converting a differential signal between the two detected signals into a digital signal and accumulating the digital signal; and storing the accumulated digital signal in a digital memory.

In an aspect of one or more embodiments, there is provided at least one non-transitory computer readable recording medium storing computer readable instructions, which, when executed by at least one processor, performs the method for suppressing a background signal.

In an aspect of one or more embodiments, there is provided a sensor for suppressing a background signal, the sensor including an accumulator that converts a differential signal between two signals detected from an arbitrary pixel of a pixel array at predetermined times into a digital signal and accumulates the digital signal; and a digital memory that stores the accumulated digital signal, wherein the accumulator alternately cross-samples the two signals on different circuits at each predetermined time to provide the differential signal for conversion into the digital signal and for accumulation of the digital signal.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1A:
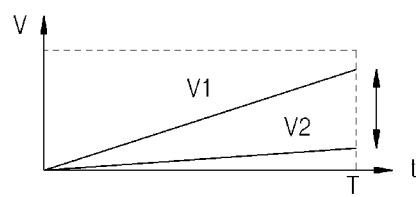
FIGS. 1A, 1B, and 1C are diagrams for explaining a principle of suppressing a background signal which is used for a sensor for suppressing a background signal, according to one or more embodiments.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein.

Exemplary embodiments are intended only for the purpose of an illustration and the present disclosure is not limited to exemplary embodiments. Exemplary embodiments are examples. However, exemplary embodiments are not intended as definitions of the limits of the scope of the present disclosure. Other modifications may be made by one skilled in the art from the detailed description and embodiments thereof also are within the scope of the present disclosure.

In this disclosure, the terms "comprising" and "including" should not be construed as necessarily including all of the elements or steps described herein, and should be construed as not including some of the elements or steps thereof, or should be construed as further including additional elements or steps.

Furthermore, the terms used herein including an ordinal number such as "first", "second", etc. may be used to describe various elements, but the elements should not be limited by the terms. The terms are used merely to distinguish an element from the other element.

Embodiments of the present disclosure relate to a sensor and method for suppressing a background signal. In the following description, detailed descriptions of functions and configurations that are well known to those skilled in the art are omitted.

Figure 1B:
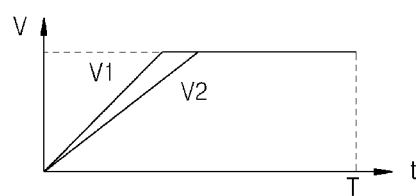
Figure 1C:
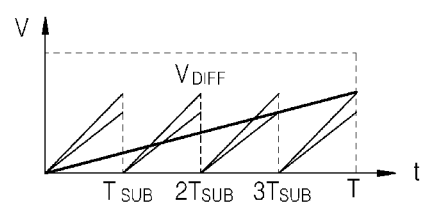

FIGS. 1A, 1B, and 1C are diagrams for explaining a principle of suppressing a background signal which is used for a sensor for suppressing a background signal, according to one or more embodiments.

FIGS. 1A, 1B and 1C illustrate two signals detected from an arbitrary pixel of a pixel array. FIG. 1A represents two signals in a case where there is no background signal, and a differential signal between the two signals. FIG. 1B represents two signals in a case where there is a background signal, and saturation of the two signals. FIG. 1C is a diagram illustrating a method of acquiring a differential signal between two signals from which a background signal has been respectively suppressed when saturation of the two signals occurs within a sensing time T due to the background signal.

The differential V1−V2 between the two signals is accumulated for the sensing time T. A sensor reads a signal at a time point T. When there is no background signal, the outputs of the two signals detected by the arbitrary pixel may be provided as in FIG. 1A. However, when the background signal is large or the sensing time is long and thus, the background signal is accumulated for a long time period, the saturation of the two signals occurs within the sensing time T, thereby hardly detecting the differential signal between the two signals. Referring to FIG. 1B, when the outputs of the two signals are in a saturation state and a predetermined time has elapsed, the values V1 and V2 of the two signals both become maximum values and the differential signal between the two signals becomes zero.

Therefore, when the background signal is large or the sensing time is long and thus, the background signal is accumulated for a long time period, the differential signal between the two signals may be detected as illustrated in FIG. 10 in order to prevent the outputs of the two signals from being in a saturation state. Referring to FIG. 1C, the sensing time T is divided into several sub-sensing times $T_{SUB}$ and the differential signal is calculated each time the sub-sensing time has elapsed. The differential time is added to a value measured at a previous sub-sensing time to acquire the differential time between the two signals. In this case, the sub-sensing time $T_{SUB}$ is shorter than a threshold time at which the sensor deviates from a dynamic range that is a maximum range to detect a signal from the arbitrary pixel of the pixel array and corresponds to any one section when a total sensing time, that is, the sensing time T is divided into a plurality of sections. The total sensing time, that is, the sensing time T may be divided by an even number.

As illustrated in FIG. 10, an adder for calculating a differential signal and a memory for accumulation of the differential signal are required to detect the differential signal between the two signals. A sensor for suppressing a background signal, according to one or more embodiments, will be described below.

Figure 2:
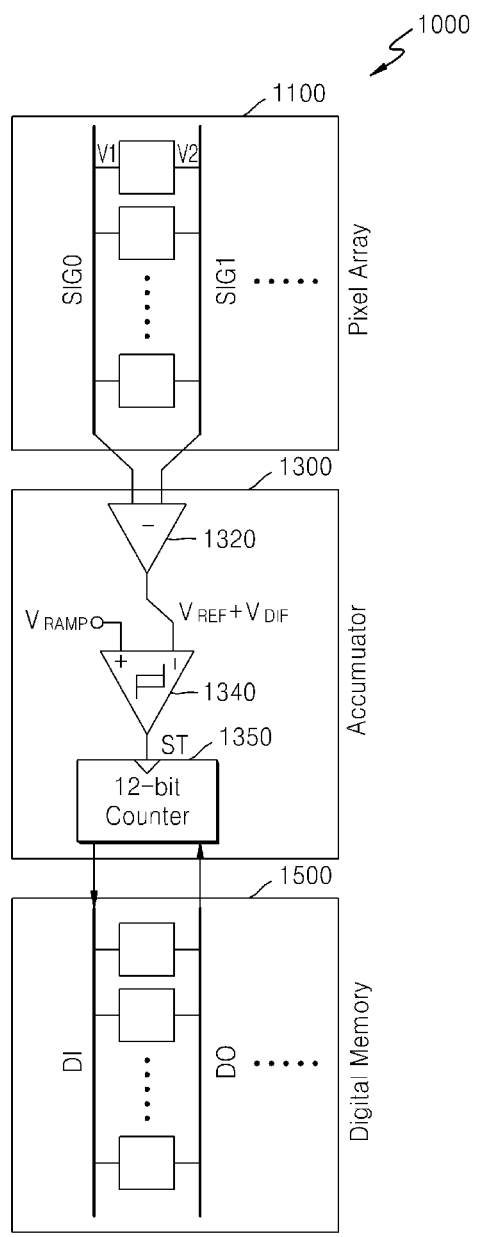
FIG. 2 is a diagram for explaining a structure and layout of a sensor for suppressing a background signal, according to one or more embodiments.

FIG. 2 is a diagram for explaining a structure and layout of a sensor 1000 for suppressing a background signal, according to one or more embodiments. Although a time of flight (TOF) image sensor for performing temporal/spatial differential readout is given as an example for convenience of description, other sensor structures are also applicable. Those skilled in the art will appreciate that other common components may be further included in addition to the components illustrated in FIG. 2.

Referring to FIG. 2, the sensor 1000 for suppressing a background signal, according to one or more embodiments, may include a pixel array 1100, an accumulator 1300, and a digital memory 1500. The accumulator 1300 may include a subtracter 1320, a comparator 1340, and a counter 1350. The subtracter 1320 may be implemented to be integrated with the accumulator 1300 or unlike FIG. 2, may be implemented to be separate from the accumulator 1300.

The accumulator 1300 reads out a previous accumulated value of a differential signal from the digital memory 1500 and accumulates a differential signal detected at each predetermined time to the previous accumulated value of a differential signal. For example, the accumulator 1300 may include the comparator 1340 for comparing a differential signal with a linearly increasing or decreasing predetermined function and converting the differential signal into a digital signal and the counter 1350 for increasing or decreasing a value of the predetermined function linearly until the value reaches a value of the differential signal and accumulating the value of the differential signal to the previous accumulated value of the differential signal. As another example, the accumulator 1300 may include a analog-to-digital converter (ADC) 1370 for converting the differential signal, which is an analog signal, into a digital signal and a digital adder 1380 for adding the differential signal, which has been converted into the digital signal, to a previous accumulated value of the differential signal.

In FIG. 2, one column of a plurality of columns in the pixel array 1100 is only illustrated. Two signals V1 and V2 are output, which are detected by a pixel of a row selected in the pixel array 1100. The two detected signals V1 and V2 are input to the subtracter 1320 of the accumulator 1300. The subtracter 1320 will be described with reference to FIG. 3 below.

Figure 3:
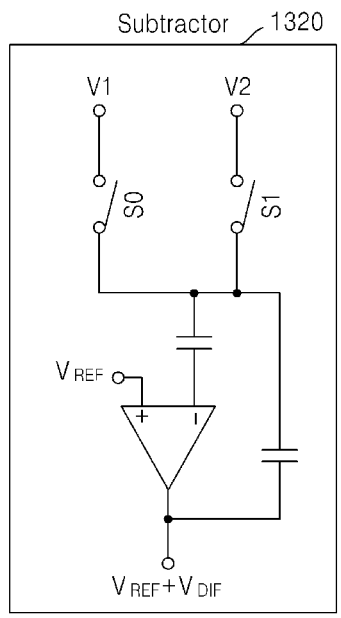
FIG. 3 is a diagram of a subtracter used in an accumulator of a sensor for suppressing a background signal, according to one or more embodiments.

FIG. 3 is a diagram of the subtracter 1320 used in an accumulator of a sensor for suppressing a background signal, according to one or more embodiments.

The subtracter 1320 may sequentially transfer signals detected by the pixel array 1100 by using switching devices S0 and S1. The subtracter 1320 sequentially receives the two detected signals V1 and V2 and outputs a signal having the form of $V_{REF}+V_{DIF}$ in which a differential signal $V_{DIF}$ (=V1−V2) between the two signals is added to a reference voltage $V_{REF}$ of an amplifier.

Referring to FIG. 2 again, the signal having the form of $V_{REF}+V_{DIF}$, including the differential signal $V_{DIF}$(=V1−V2) between the two signals which is output from the subtracter 1320, is input to one input terminal of the comparator 1340. The accumulator 1300 loads a previous accumulated value stored in the digital memory 1500 onto the counter 1350. While the counter 1350 increases continuously, the comparator 1340 compares the signal having the form of $V_{REF}+V_{IDF}$, including the differential signal $V_{DIF}$ (=V1−V2) between the two signals, with a ramp signal $V_{RAMP}$. The counter 1350 identifies a counting value when the two compared signals become equal to each other and outputs a result of adding a differential signal $V_{DIF}$(=V1−V2) between two signals generated newly using the counting value to a previous accumulated value. The value output from the counter 1350 is stored in the digital memory 1500.

Figure 4:
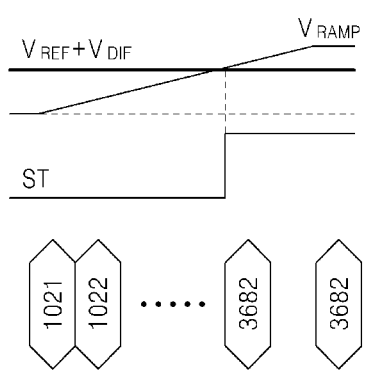
FIG. 4 is a diagram explaining operation of a comparator and a counter used in an accumulator of a sensor for suppressing a background signal, according to one or more embodiments.

FIG. 4 is a diagram explaining operation of the comparator 1340 and the counter 1350 used in an accumulator of a sensor for suppressing a background signal, according to one or more embodiments.

Referring to FIG. 4, a signal having the form of $V_{REF}+V_{DIF}$, including a differential signal $V_{DIF}$(=V1−V2) between two signals, which is output from the subtracter 1320, is compared with a ramp signal $V_{RAMP}$. A predetermined function increasing at a predetermined slope may be used for the ramp signal $V_{RAMP}$. The counter 1350 performs counting and when the two signals become equal to each other, the counting value is identified. The value of the differential signal $V_{DIF}$(=V1−V2) between two signals is identified using the ramp signal $V_{RAMP}$ and the identified counting value and is accumulated to a previous accumulated value.

In the accumulator 1300 of the sensor 1000, according to one or more embodiments, a counting method for accumulation may be implemented using a simple circuit including the comparator 1340 and the counter 1350, thereby occupying a small area, achieving low power consumption, and securing linearity. On the other hand, since a clock cycle $2^N$ is required in order to accumulate N-bits, much time is taken and thus, a signal may be in a saturation state for an accumulation time. Therefore, in order to suppress a large background signal, it is important to shorten subtraction and accumulation time. Since a high frequency is required to perform a high speed operation for subtraction and accumulation, but power consumption is proportional to a frequency, there is a limitation to increase the frequency. Accordingly, the accumulator 1300 of the sensor 1000 according to one or more embodiments may be implemented to have a pipeline to improve speed.

Figure 5:
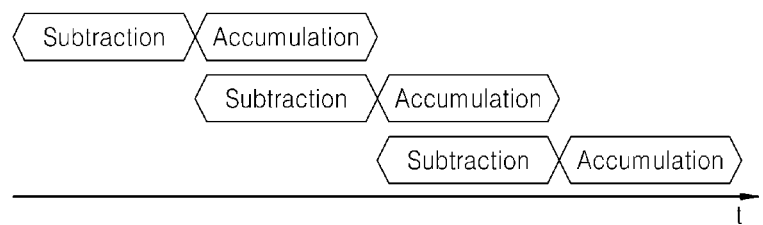
FIG. 5 is a diagram explaining a pipeline structure for subtraction and accumulation operations of an accumulator of a sensor for suppressing a background signal, according to one or more embodiments.

FIG. 5 is a diagram explaining a pipeline structure for subtraction and accumulation operations of the accumulator 1300 of the sensor 100 for suppressing a background signal, according to one or more embodiments.

Referring to FIG. 5, the accumulator 1300 of the sensor 1000, according to one or more embodiments, may be implemented using a pipeline structure to improve speed. The accumulator 1300 using the pipeline structure may perform an operation of subtracting two signals detected at each predetermined time and an operation of converting a differential signal between the two detected signals into a digital signal and performing accumulation in a pipeline.

Figure 6:
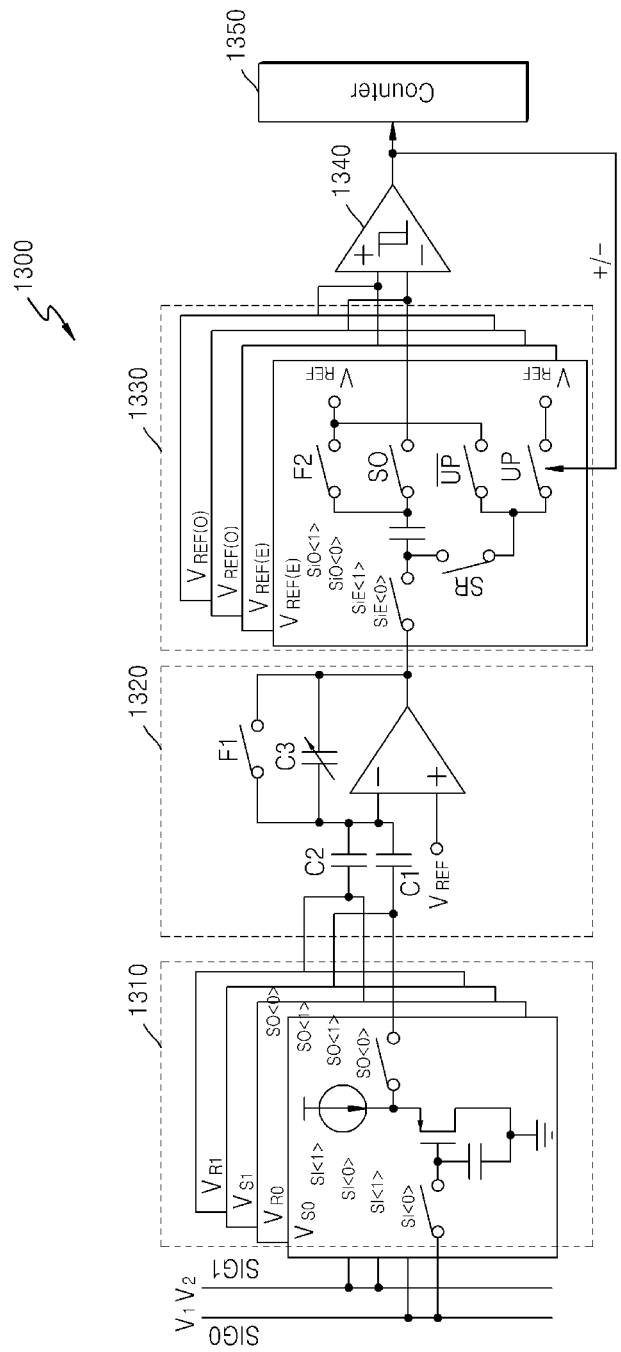
FIG. 6 is a diagram of a pipeline-structured accumulator of a sensor for suppressing a background, according to one or more embodiments.

FIG. 6 is a diagram of a pipeline-structured accumulator 1300 of a sensor for suppressing a background, according to one or more embodiments.

Referring to FIG. 6, the pipeline-structured accumulator 1300 may mainly include a first sample and hold circuit (S&H1) 1310, a subtracter 1320, a second sample and hold circuit (S&H2) 1330, a comparator 1340 and a counter 1350.

The S&H1 1310 receives $V_{S0}$ and $V_{S1}$ detected by the pixel array 1100 respectively from SIG0 and SIG1 and temporally stores the $V_{S0}$ and $V_{S1}$. The S&H1 1310 may receive and store $V_{R0}$ and $V_{R1}$ in order to remove fixed pattern noise.

The S&H1 1310 includes a capacitor for storage, a source follower amplifier for readout, and a switching device for access. Input switches SI<0> and SI<1 > for sampling store detected signals or reset signals. According to the switching order of output switches SO<0> and SO<1> for transferring a sampled signal, the sign of a signal may be changed in the subtracter 1320 that is a sequential step. The sign change is necessary for suppression of fixed pattern noise due to different source follower amplifiers. The operations of the S&H1 1310 and the subtracter 1320 will be described in detail with reference to FIGS. 7A and 7B below.

Figure 7A:
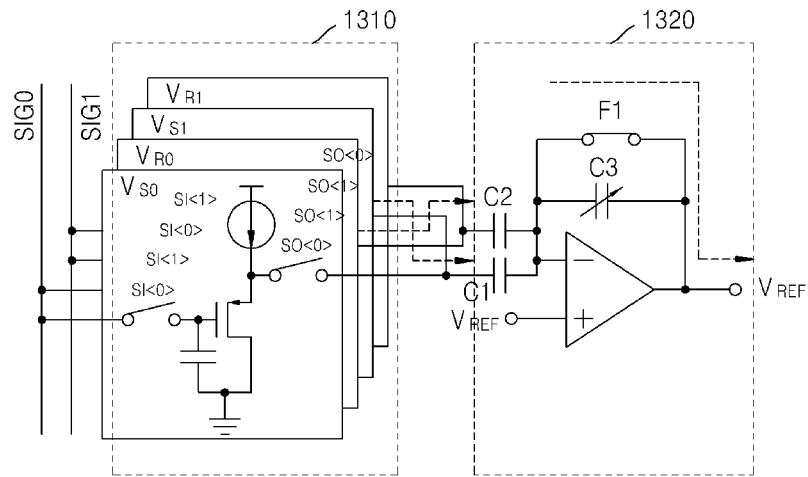
FIGS. 7A and 7B are diagrams explaining operations of a first sample and hold circuit and a subtracter used in a pipeline-structured accumulator of a sensor for suppressing a background signal, according to one or more embodiments.
Figure 7B:
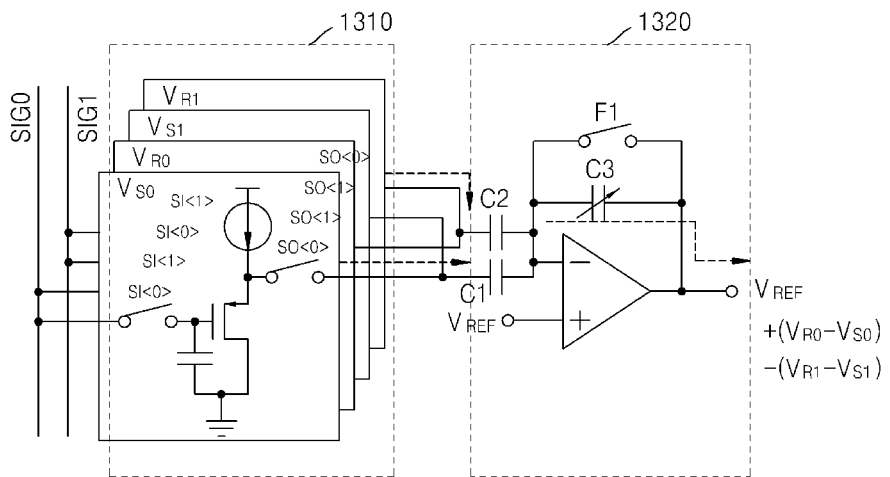

FIGS. 7A and 7B are diagrams explaining operations of the S&H1 1310 and the subtracter 1320 used in a pipeline-structured accumulator of a sensor for suppressing a background signal, according to one or more embodiments. The subtracter 1320 may include a capacitive feedback amplifier. The operations of the S&H1 1310 and the subtracter 1320 will be described below.

First, a feedback switch F1 is turned on and $V_{S0}$ and $V_{S1}$ are sampled on input capacitors C1 and C2, as illustrated FIG. 7A. Thereafter, when the feedback switch F1 is turned off and $V_{S0}$ and $V_{S1}$ are received, an output $V_{SUBT}$ of the subtracter 1320 is expressed by Equation 1.

$$\begin{aligned}V_{SUBT} &= V_{REF} + \left\{\frac{C1}{2C3}(V_{R0}-V_{S0}) + \frac{C2}{2C3}(V_{S1}-V_{R1})\right\} \\ &= V_{REF} + \left\{\frac{C1}{2C3}(V_{R0}-V_{S0}) - \frac{C2}{2C3}(V_{R1}-V_{S1})\right\} \\ &= V_{REF} + \{(V_{R0}-V_{S0})-(V_{R1}-V_{S1})\} \\ &= V_{REF} + V_{DEF} \text{ if } (C1=C2=C3).\end{aligned}$$ [Equation 1]

As seen from Equation 1, the output has a form in which the differential signal $V_{DIF}$ is added to the reference voltage $V_{REF}$, and two signals $V_{R0}-V_{S0}$ and $V_{R1}-V_{S1}$ are signals from which fixed pattern noise due to the pixels of the pixel array 1100 is suppressed.

On the other hand, fixed pattern noise generated from the source follower amplifiers of the S&H1 1310 is not suppressed because four different source follower amplifiers are used, that is, the four source follower amplifiers of the S&H1 1310 have different offset voltages $V_{OFF}$. According to the present disclosure, the offset voltage $V_{OFF}$ is removed by performing cross sampling on a detected sensing signal $V_S$ ($V_{S0}$ and $V_{S1}$) and a reset signal $V_R$ ($V_{R0}$ and $V_{R1}$) by using the four circuits constituting the S&H1 1310 at each sub-sensing time $T_{SUB}$. For example, there may be $V_{OFF1}$, $V_{OFF2}$, $V_{OFF3}$, and $V_{OFF4}$ having different values in the S&H1 1310 including the four circuits, that is, first to fourth circuits. In order to remove them, the reset signal $V_R$ is sampled on the first circuit of the S&H1 1310 and the third circuit of the S&H1 1310 at a first sub-sensing time $T_{SUB}$. When the sensing signal $V_S$ is sampled on the second circuit of the S&H1 1310 and the fourth circuit of the S&H1 1310, the reset signal $V_R$ is sampled on the second circuit of the S&H1 1310 and the fourth circuit of the S&H1 1310 and the sensing signal $V_S$ is sampled on the first circuit of the S&H1 1310 and the third circuit of the S&H1 1310 at a second sub-sensing time $2T_{SUB}$. By cross sampling the reset signal $V_R$ and the sensing signal $V_S$ at different positions in the S&H1 1310, the offset voltage $V_{OFF}$ components of the respective circuits constituting the S&H1 1310 cancel each other upon accumulation.

The S&H1 1310 of FIGS. 7A and 7B performs cross sampling on the detected sensing signal $V_S$ and the reset signal $V_R$ at different positions alternately in the S&H1 1310 with respect to an arbitrary pixel of the pixel array 1100 by switching the operating orders of SI<0> and SI<1> at each predetermined time, for example, each sub-sensing time $T_{SUB}$. The subtracter 1320 may receive the cross-sampled sensing signal $V_S$ and perform a subtraction operation at each sub-sensing time $T_{SUB}$. In addition, the subtracter 1320 may receive the cross-sampled reset signal $V_R$ for removal of fixed pattern noise due to pixels of the pixel array 1100 and perform a subtraction operation on the same. That is, the subtracter 1320 performs a subtraction operation on two signals which are cross-sampled by different circuits alternately at each predetermined time to output a differential signal.

At $1T_{SUB}$ that is a first sub-sensing time $T_{SUB}$, when the switch SI<1> is first operated and thereafter, SI<0> is operated, $V_{DIF1}$ is calculated by Equation 2.

$$|V_{DIF1}|=\{(V_{R0}+V_{OFF2})-(V_{S0}+V_{OFF1})\}-\{(V_{R1}+V_{OFF4})-(V_{S1}+V_{OFF3})\}$$ [Equation 2]

At $2T_{SUB}$ that is a second sub-sensing time $T_{SUB}$, when the switch SI<0> is first operated and thereafter, SI<1> is operated, $V_{DIF2}$ is calculated by Equation 3.

$$|V_{DIF2}|=\{(V_{R0}+V_{OFF1})-(V_{S0}+V_{OFF2})\}-\{(V_{R1}+V_{OFF3})-(V_{S1}+V_{OFF4})\}$$ [Equation 3]

In Equation 3, it is assumed that a resultant sensing signal at $1T_{SUB}$ is identical to a resultant sensing signal at $2T_{SUB}$. After $2T_{SUB}$, the accumulated differential signal $V_{DIF1}+V_{DIF2}$ is $2\{(V_{R0}-V_{S0})-(V_{R1}-V_{S1})\}$ from which the offset voltage $V_{OFF}$ components of the S&H1 1310 are removed. The output of the subtracter 1320 has a form in which the differential signal $V_{DIF}$ is added to the reference voltage $V_{REF}$ and the differential signal $V_{DIF}$ may be a + or − value.

In a normal case, respective differential signals $V_{DIF}$ at respective sub-sensing times $T_{SUB}$ have the same sign.

A capacitor C3 of the capacitive feedback amplifier is designed to have different capacitance values according to external inputs to enable the subtracter 1320 to have a gain larger than 1, which achieves reduction in input referred noise to improve a signal to noise ratio (SNR).

Figure 8A:
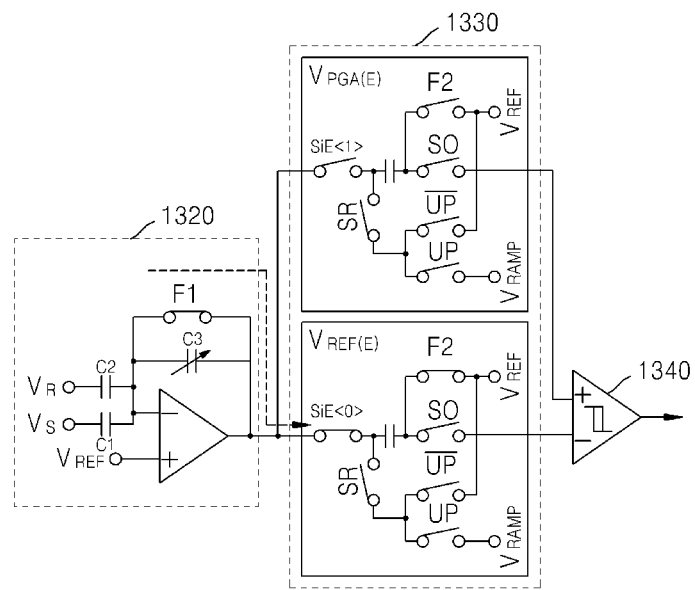
FIGS. 8A and 8B are diagrams explaining a sampling operation of a second sample and hold circuit used in a pipeline-structured accumulator of a sensor for suppressing a background signal, according to one or more embodiments.
Figure 8B:
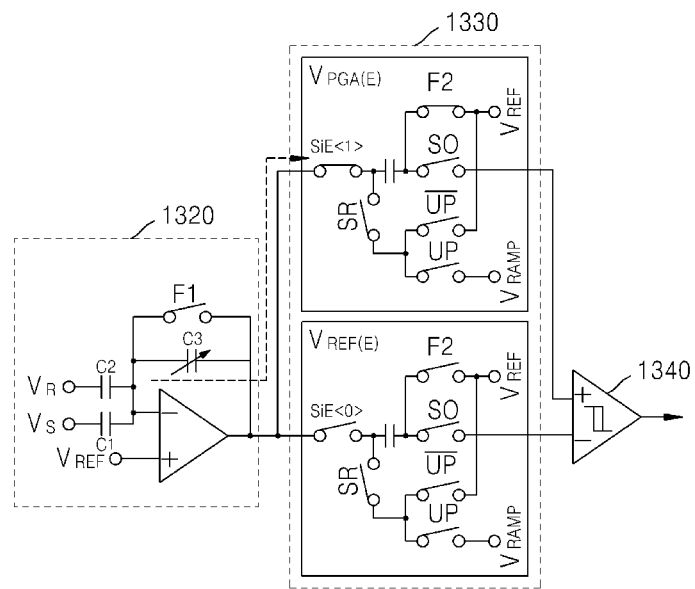

FIGS. 8A and 8B are diagrams explaining a sampling operation of an S&H2 1330 used in a pipeline-structured accumulator of a sensor for suppressing a background signal, according to one or more embodiments.

The S&H2 1330 temporally stores an output of the subtracter 1320 in order to perform the accumulation operation of the accumulator 1300. The S&H2 1330 may include four circuits total and may include 2 sets of an even set and an Odd set for a pipeline. When the even set performs an accumulation operation, the odd set samples the output of the subtracter 1320. When the even set performs sampling, the odd set performs an accumulation operation. Each set includes two circuits in order to remove the offset voltage $V_{OFFS}$ of an amplifier included in the subtracter 1320. Respective circuits of each set sample and store a signal having the form of $V_{REF}+V_{OFFS}+\{(V_{R0}-V_{S0})-(V_{R1}-V_{S1})\}$ including a signal having the form of $V_{REF}+V_{OFFS}$ in which the offset voltage $V_{OFFS}$ is added to the reference voltage $V_{REF}$ of the subtracter 1320, and a resultant signal of subtraction. These signals are input to positive and negative input terminals of the comparator 1340, and the offset voltage $V_{OFFS}$ is removed because these signals are subtracted from each other.

For example, the sampling operation of the S&H2 1330 when sampling is performed on the even set will be described below. As illustrated in FIG. 8A, the feedback switch F1 of the subtracter 1320 is turned on. In respective circuits of the even set, a switch SIE<0> is turned on and a switch SIE<1> is turned off. In the circuit including the switch SIE<0>, a switch F2 is turned on, a switch SR is turned off, and a switch SO is turned off. Therefore, an output $V_{REF}$ of the subtracter 1320 is sampled on a capacitor of any one circuit of the even set. Thereafter, as illustrated in FIG. 8B, the feedback switch F1 of the subtracter 1320 is turned off. In respective circuits of the even set, the switch SIE<0> is turned off and a switch SIE<1> is turned on. In the circuit including the switch SIE<1>, a switch F2 is turned on, a switch SR is turned off, and a switch SO is turned off. Therefore, an output $V_{REF}+\{(V_{R0}-V_{S0})-(V_{R1}-V_{S1})\}$ of the subtracter 1320 is sampled on a capacitor of the other circuit of the even set. The S&H2 1330 is in a hold state before the accumulation operation after sampling.

Figure 9A:
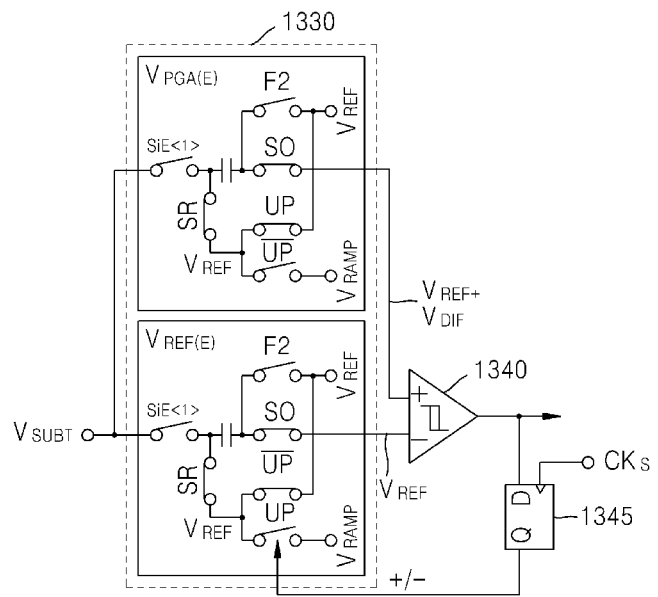
FIGS. 9A and 9B are diagrams explaining an operation for sign decision in a second sample and hold circuit used for a pipeline-structured accumulator of a sensor for suppressing a background signal, according to one or more embodiments.
Figure 9B:
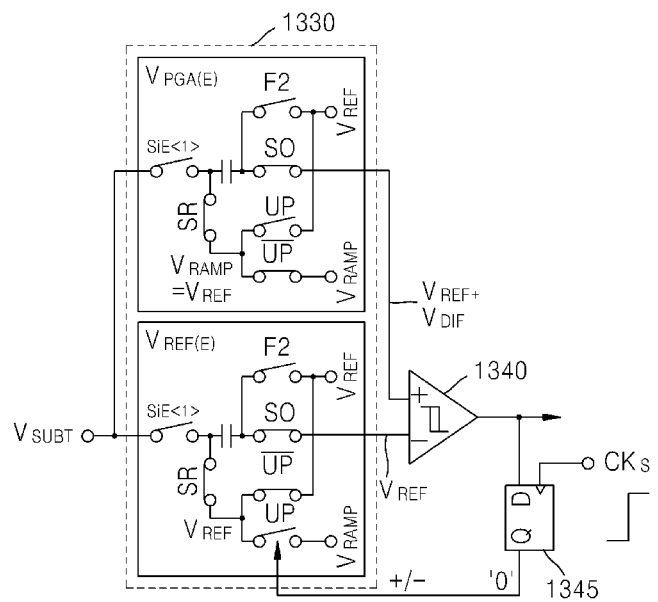

FIGS. 9A and 9B are diagrams explaining an operation for sign decision in an S&H2 1330 used in a pipeline-structured accumulator of a sensor for suppressing a background signal, according to one or more embodiments.

The S&H2 1330 decides the sign of $V_{DIF}=(V_{R0}-V_{S0})-(V_{R1}-V_{S1})$ before performing an accumulation operation after sampling. The reason for this is to reduce an input range required in analog to digital (AD) conversion. That is, when an input of +/−1 V swing is received, the sign thereof is decided and indicated by a sign bit. AD conversion may be performed by an analog to digital convert (ADC) having an input range of 1 V.

The pipeline-structured accumulator 1300 of the sensor according to one or more embodiments performs sign decision by using the comparator 1340 without an additional timing budget and when the sign is '+', performs accumulation through up counting and when the sign is '−', performs accumulation through down counting.

For example, when accumulation is performed by the even set, the accumulation operation of the S&H2 1330 will be described below. As illustrated in FIG. 9A, a switch SR is turned on to develop the reference voltage $V_{REF}$ at the left of a capacitor. At the same time, a switch SO is turned on to connect the right of the capacitor to the input of the comparator 1340. Due to coupling, the voltage at the right of the capacitor, that is, the input V+ and V− of the comparator 1340 become $V_{REF}+V_{DIF}$ and $V_{REF}$, respectively. As illustrated in FIG. 9B, the output of the comparator 1340 is latched in a D flip-flop 1345. Based on the latched sign information UP, the ramp signal is applied to one having a smaller voltage of the two inputs $V_{REF}+V_{DIF}$ and $V_{REF}$ of the comparator 1340.

Figure 10A:
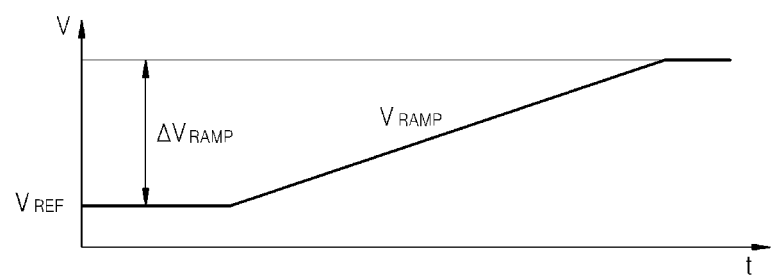
FIGS. 10A, 10B and 10C are diagrams illustrating an input voltage of a comparator in an accumulation operation of a pipeline-structured accumulator of a sensor for suppressing a background signal, according to one or more embodiments.
Figure 10B:
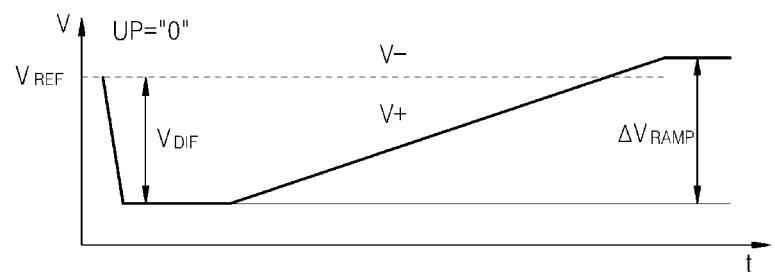
Figure 10C:
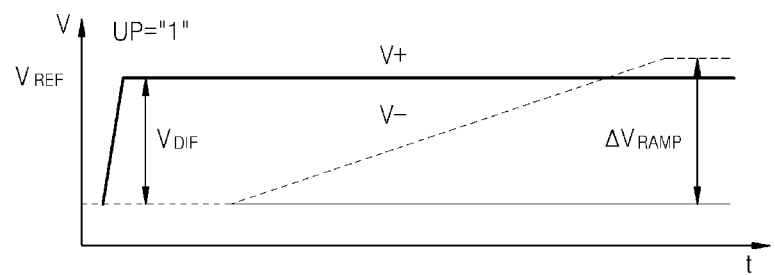

FIGS. 10A, 10B and 10C are diagrams illustrating an input voltage of the comparator 1340 in an accumulation operation of a pipeline-structured accumulator of a sensor for suppressing a background signal, according to one or more embodiments.

FIG. 10A is a diagram illustrating a ramp signal.

Referring to FIG. 10B, when a differential signal $V_{DIF}$ is smaller than zero, that is, $(V+=V_{REF}+V_{DIF})<(V-=V_{REF})$ UP=0 and the ramp signal is applied to a '+' input. The counter 1350 performs down counting.

Referring to FIG. 10C, when a differential signal $V_{DIF}$ is larger than zero, that is, $(V+=V_{REF}+V_{DIF})>(V-=V_{REF})$ UP=1 and the ramp signal is applied to a '−' input. The counter 1350 performs up counting.

In this case, fixed pattern noise may occur due to an offset voltage $V_{OFFS}$ even in the comparator 1340. Removal of fixed pattern noise due to the offset voltage $V_{OFFS}$ of the comparator 1340 will be described with reference to FIG. 11 below.

Figure 11:
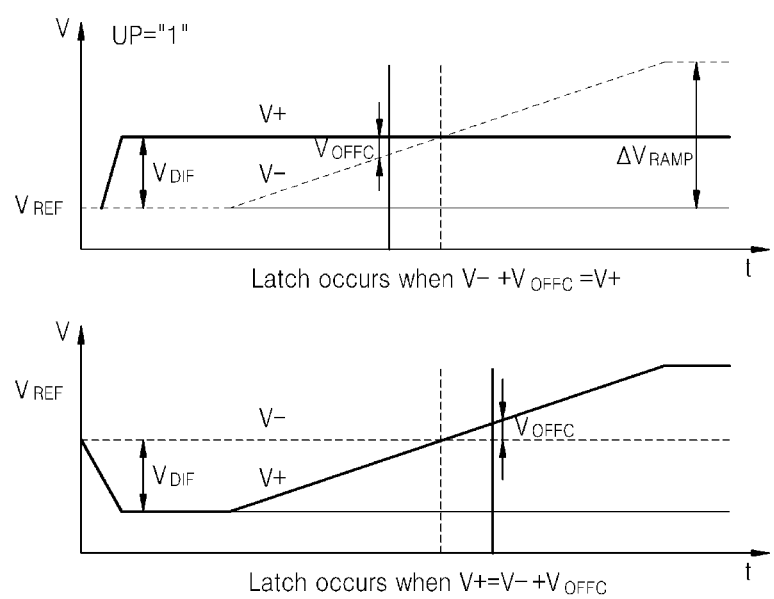
FIG. 11 is a diagram explaining a process of removing an offset voltage of a comparator.

FIG. 11 is a diagram explaining a process of removing an offset voltage of the comparator 1340.

As described above, the output of the subtracter 1320 has a form in which a differential signal is added to a reference voltage $V_{REF}$, and a differential signal VIDF may be a positive or negative value. In a normal case, the signs of respective differential signals $V_{DIF}$ at respective sub-sensing times $T_{SUB}$ are identical to each other. However, in order to remove the offset voltage $V_{OFFC}$ of the comparator 1340, the sign of the differential signal $V_{DIF}$ output at an even-th sensing time $T_{SUB}$ is changed. For example, when the sign of the differential signal $V_{DIF}$ is positive, $V_{REF}+V_{DIF}$ is output at a first sensing time $T_{SUB1}$ and $V_{REF}-V_{DIF}$ is output at a second sensing time $T_{SUB2}$. Thus, there is no need for separate control of sign change. As seen from FIGS. 7A and 7B, in order to remove offset voltage $V_{OFF}$ components of the S&H1 1310, the operating orders of SI<0> and SI<1> are switched, and thus, the sign of an output is changed. In this case, when viewed from the input terminals of the comparator 1340, during a first sensing time $T_{SUB1}$, an input voltage V+ at the positive input terminal is larger than the negative input terminal and an input voltage V+ at the positive input terminal is scanned while being increased by the ramp signal $V_{RAMP}$. In this case, a result of accumulation is a resultant value of being latched when $V-+V_{OFFC}$ becomes equal to V+. During a second sensing time $T_{SUB2}$, the input voltage V− at the negative input terminal is larger than the positive input terminal and an input voltage V− at the negative input terminal is scanned while being increased by the ramp signal $V_{RAMP}$. In this case, a result of accumulation is a resultant value of being latched when V+ becomes equal to $V-+V_{OFFC}$. Therefore, a final accumulated value resulting from addition of the result value during the first sensing time $T_{SUB1}$ and the result value during the second sensing time $T_{SUB2}$ is a value from which $V_{OFFC}$ has been canceled. By changing a latching time point by changing the polarity of the input terminals, $V_{OFFC}$ is canceled. Referring to FIG. 11, time points at which latching is generated are illustrated and identified.

Figure 12:
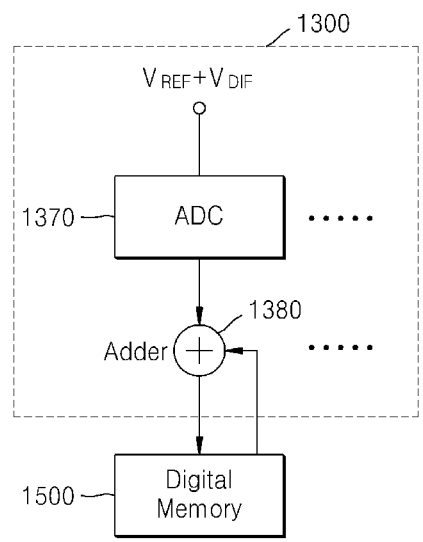
FIG. 12 is a diagram illustrating another embodiment of an accumulator of a sensor for suppressing a background signal, according to one or more embodiments.

FIG. 12 is a diagram illustrating another embodiment of an accumulator of a sensor for suppressing a background signal according to one or more embodiments.

FIG. 12 illustrates another implementation of an accumulator 1300 for high speed operation. The accumulator 1300 of FIG. 12 includes the high-speed ADC 1370 and the digital adder 1380. The accumulator 1300 rapidly converts a differential value into a digital value and performs accumulation on a newly generated differential signal value through the digital adder 1380. The high-speed ADC 1370 may be implemented in various types, such as a Cyclic ADC, a successive approximation register (SAR) ADC, and a flash ADC.

Referring to FIG. 2 again, the sensor 1000 according to one or more embodiments may use the digital memory 1500 in order for the accumulator 1300 to store an accumulated value. The digital memory 1500 may be implemented in various types, such as 1-transistor (1-T) DRAM, 3-T DRAM, and SRAM. When using an analog memory, a degradation in performance may occur due to a slow access time, a low SNR, and short-time storage. A capacitance of several hundreds fF is required to improve the degradation in performance, but there is a limitation that large area is needed to arrange a number of analog memories corresponding to the number of pixels in an array structure, such as, a biosensor or an image sensor. That is, there is a problem in scalability. According to the present disclosure, a differential signal between two detected signals is converted into a digital signal and accumulated in the digital memory 1500, thereby achieving a rapid access time, a high SNR, a long-time storage to bring an improved effect in accessibility, effectiveness, and storage.

Another advantage obtained by using the digital memory 1500 is to remove kTC noise by storing a reset signal for a long time (greater than 1 ms) without loss. According to one or more embodiments, correlated double sampling is performed by utilizing a structure in which the digital memory 1500 is built-in, thereby removing fixed pattern noise and kTC noise, as described with reference to FIG. 13 below.

Figure 13:
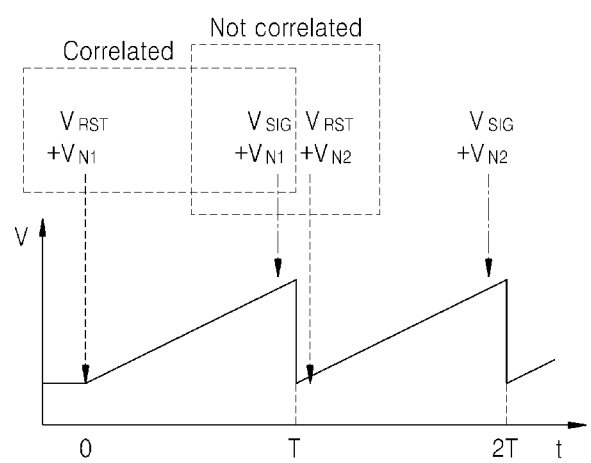
FIG. 13 is a diagram explaining correlated double sampling.

FIG. 13 is a diagram explaining correlated double sampling.

In order to remove fixed pattern noise $V_{FPN}$ existing in a readout circuit, a sensor reads out a reset signal and a resultant sensing signal to acquire a differential value therebetween and outputs a value from which fixed pattern noise $V_{FPN}$ has been canceled. This process is called double sampling (DS). When kTC reset noise $V_N$ that has been added to the reset signal is correlated with kTC noise which has been added to the detected signal, the kTC noise is removed when the differential value therebetween is calculated. This process is called correlated double sampling (CDS).

However, when a detection node is used as an analog memory as in a TOF-based 3D image sensor, signals are accumulated at the detection node. Therefore, a reset operation is not performed before a resultant sensing signal is read out. In addition, when a sense node is the same as the detection node, for example, when a detection circuit is directly connected to the detection node, a reset operation is not performed before a resultant sensing signal is read out, thereby causing CDS to be impossible.

According to one or more embodiments, CDS is performed by utilizing a structure in which the digital memory 1500 is built-in, thereby removing fixed pattern noise and kTC noise.

The present embodiment includes a memory for suppressing a background signal and stores a reset signal in the digital memory 1500. The present embodiment loads the stored reset signal from the digital memory 1500 after a sensing time T has been reached and acquires a differential signal between the reset signal and the resultant sensing signal.

Figure 14:
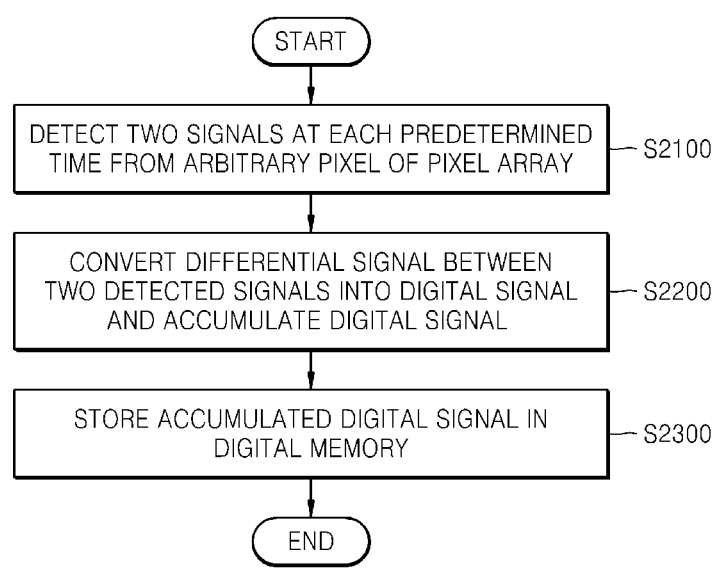
FIG. 14 is a flowchart of a method for suppressing a background signal, according to one or more embodiments.

FIG. 14 is a flowchart of a method of suppressing a background signal, according to one or more embodiments.

Two signals are detected from an arbitrary pixel of the pixel array 1100 for detecting a signal by using a plurality of pixels at each predetermined time (S 2100). In this case, the predetermined time is shorter than a threshold time at which a sensor deviates from a dynamic range, which is a maximum range in which the sensor is able to detect a signal from an arbitrary pixel of the pixel array 1100 and may be a time corresponding to any one section when a total sensing time is divided into a plurality of sections. In this case, the total sensing time may be divided by an even number. During the total sensing time, two signals are detected at predetermined times.

A differential signal between the two detected signals is converted into a digital signal and is accumulated (S 2200). To this end, the two signals which are cross sampled on different circuits alternately at each predetermined time are subtracted from each other, and the differential signal is output. On the other hand, a background signal for an arbitrary pixel of the pixel array 1100 is previously stored in the digital memory 1500. In this case, the background signal for the arbitrary pixel may be various types of noise inherently existing due to characteristics of the pixel array.

Specifically, a previous accumulated value of the differential signal is read out from the digital memory 1500 and the differential signal detected at each predetermined time is converted into a digital signal and is accumulated to the previous accumulated value of the differential signal. For example, the differential signal is compared with a linearly increasing or decreasing predetermined function and the differential signal is converted into a digital signal. The value of the differential signal is accumulated to the previous accumulated value of the differential signal by increasing and decreasing the value of the predetermined function until the value of the predetermined function reaches the value of the differential signal. As another example, the differential signal that is an analog signal is converted into a digital signal by using a high-speed ADC 1370 and the differential signal, which has been converted into the digital signal, is added to the previous accumulated value of the differential signal.

On the other hand, the operation of subtracting two signal detected at each predetermined time and the operation of converting the differential signal into a digital signal and performing accumulation are performed in a pipeline.

At each predetermined time, the accumulated signal is stored in the digital memory 1500 (S 2300).

As described above, according to the one or more of the above embodiments of the present disclosure, a differential signal between two detected signals is converted into a digital signal and accumulated in the digital memory 1500 when a desired signal is not detected due to a background signal, thereby achieving a rapid access time, a high SNR, a long-term storage to bring an improved effect in accessibility, effectiveness, and storage.

The method of suppressing a background signal, according to embodiments of the present disclosure, may be written in the form of a program that may be executed by a computer and may be implemented in a general-purpose digital computer which executes the program using a computer-readable recording medium. The computer-readable recording medium may include recording media, such as magnetic recording media (e.g., ROM, a floppy disk, and a hard disk) and optical reading media (e.g., CD-ROM or DVD).

Methods according to the above-described example embodiments may be recorded in non-transitory computer-readable media storing program instructions (computer readable instructions) to implement various operations embodied by a computing device such as a computer. The computing device may have one or more processors. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable recording media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The program instructions may be stored and executed in a distributed fashion in non-transitory computer-readable recording media of a distributed network. The program instructions may be executed by one or more processors or processing devices. The computer-readable media may also be embodied in at least one application specific integrated circuit (ASIC) or Field Programmable Gate Array (FPGA). The described hardware devices may be configured to act as one or more software modules in order to perform the operations of the above-described example embodiments, or vice versa It will be appreciated by those of ordinary skill in the art that while embodiments have been described in conjunction with the detailed description thereof, one or more embodiments may be embodied in other specific forms without departing from the spirit or essential characteristics thereof. Embodiments described in this specification are to be considered in all respects as illustrative and not restrictive, the scope of the disclosure being indicated by the appended claims rather than by the foregoing description; all changes that come within the meaning and range of equivalency of the claims are intended to be embodied herein.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims and their equivalents.

What is claimed is:

1. A sensor for suppressing a background signal, the sensor comprising:
a pixel array configured to detect signals by using a plurality of pixels;
an accumulator configured to
convert a differential signal between two signals detected from an arbitrary pixel of the pixel array at predetermined times into a digital signal, and accumulate the digital signal; and
a digital memory configured to store the accumulated digital signal,
wherein the accumulator is further configured to alternately cross-sample the two signals on different circuits at the predetermined times, respectively, to provide the differential signal for conversion into the digital signal such that offset voltage components of the different circuits cancel each other upon the accumulation.

2. The sensor of claim 1, wherein the predetermined time is shorter than a threshold time at which the sensor deviates from a dynamic range that is a maximum range to detect signals from the arbitrary pixel of the pixel array and corresponds to any one section when a total sensing time is divided into a plurality of sections.

3. The sensor of claim 2, wherein the total sensing time is divided by an even number.

4. The sensor of claim 1, wherein the accumulator comprises a subtractor that is configured to perform a subtraction operation on the two signals that are cross-sampled alternately on different circuits at each predetermined time and output the differential signal.

5. The sensor of claim 1, wherein the accumulator is further configured to read out a previous accumulated value of the differential signal from the digital memory and accumulate the differential signal detected at each predetermined time to the readout previous accumulated value of the differential signal.

6. The sensor of claim 1, wherein the accumulator comprises:
a comparator configured to
compare the differential signal with a linearly increasing or decreasing predetermined function, and
convert the differential signal into the digital signal; and
a counter configured to
linearly increase and decrease a value of the predetermined function until the value of the predetermined function reaches a value of the differential signal, and
accumulate the value of the differential signal to the previous accumulated value of the differential signal.

7. The sensor of claim 1, wherein the accumulator comprises:
an analog to digital converter configured to convert the differential signal that is an analog signal into the digital signal; and
a digital adder configured to add the differential signal, which has been converted into the digital signal, to the previous accumulated value of the differential signal.

8. The sensor of claim 1, wherein the accumulator is further configured to subtract two signals detected at each predetermined time, convert the differential signal into the digital signal, and accumulate the digital signal in a pipeline.

9. The sensor of claim 1, wherein the digital memory is configured to previously store a background signal for the arbitrary pixel.

10. A method of suppressing a background signal, the method comprising:
detecting two signals from an arbitrary pixel of a pixel array that detects signals by using a plurality of pixels at each predetermined time;
converting a differential signal between the two detected signals into a digital signal and accumulating the digital signal; and
storing the accumulated digital signal in a digital memory
wherein the converting of the differential signal and the accumulating of the digital signal comprises alternately cross-sampling the two signals on different circuits at predetermined times, respectively, to provide the differential signal for conversion into the digital signal such that offset voltage components of the different circuits cancel each other upon the accumulation.

11. The method of claim 10, wherein the predetermined time is shorter than a threshold time at which the sensor deviates from a dynamic range that is a maximum range to detect signals from the arbitrary pixel of the pixel array and corresponds to any one section when a total sensing time is divided into a plurality of sections.

12. The method of claim 11, wherein the total sensing time is divided by an even number.

13. The method of claim 10, wherein the converting of the differential signal and the accumulating of the digital signal further comprises:
performing a subtraction operation on the two signals that are cross-sampled alternately on different circuits at each predetermined time; and
outputting the differential signal.

14. The method of claim 10, wherein the converting of the differential signal and the accumulating of the digital signal comprise:
reading out a previous accumulated value of the differential signal from the digital memory;
converting the differential signal detected at each predetermined time into the digital signal; and
accumulating the digital signal to the readout previous accumulated value of the differential signal.

15. The method of claim 10, wherein the converting of the differential signal and the accumulating of the digital signal comprise:
comparing the differential signal with a linearly increasing or decreasing predetermined function and converting the differential signal into the digital signal;
linearly increasing and decreasing a value of the predetermined function until the value of the predetermined function reaches a value of the differential signal; and
accumulating the value of the differential signal to the previous accumulated value of the differential signal.

16. The method of claim 10, wherein the converting of the differential signal and the accumulating of the digital signal comprise:
converting the differential signal that is an analog signal into the digital signal; and
adding the differential signal, which has been converted into the digital signal, to the previous accumulated value of the differential signal.

17. The method of claim 10, wherein the converting of the differential signal and the accumulating of the digital signal comprise:
subtracting two signals detected at each predetermined time and an operation of converting the differential signal into the digital signal; and
accumulating the digital signal in a pipeline.

18. The method of claim 10, further comprising:
previously storing a background signal for the arbitrary pixel in the digital memory.

19. At least one non-transitory computer-readable recording medium storing computer readable instructions, which, when executed by at least one processor, configure the at least one processor to perform the method of claim 10.

20. A sensor for suppressing a background signal, the sensor comprising:
an accumulator configured to
  convert a differential signal between two signals detected from an arbitrary pixel of a pixel array at predetermined times into a digital signal, and
  accumulate the digital signal; and
a digital memory configured to store the accumulated digital signal,
wherein the accumulator is further configured to alternately cross-sample the two signals on different circuits at the predetermined times, respectively to provide the differential signal for conversion into the digital signal such that offset voltage components of the different circuits cancel each other upon the accumulation.

* * * * *